United States Patent
Yoshino et al.

(10) Patent No.: US 8,022,588 B2
(45) Date of Patent: Sep. 20, 2011

(54) SINGLE-PHASE 2-POLE ELECTRIC MOTOR IN WHICH MAIN WINDINGS AND AUXILIARY WINDINGS ARE MUTUALLY OFFSET BY OTHER THAN 90 DEGREES AND MOUNTED IN DIFFERENT SIZE SLOTS

(75) Inventors: Hayato Yoshino, Tokyo (JP); Yoshio Takita, Tokyo (JP); Koji Yabe, Tokyo (JP); Tomoaki Oikawa, Tokyo (JP); Takahiro Tsutsumi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 442 days.

(21) Appl. No.: 11/814,567

(22) PCT Filed: Mar. 30, 2006

(86) PCT No.: PCT/JP2006/306613
§ 371 (c)(1),
(2), (4) Date: Jul. 24, 2007

(87) PCT Pub. No.: WO2007/116431
PCT Pub. Date: Oct. 18, 2007

(65) Prior Publication Data
US 2009/0289521 A1 Nov. 26, 2009

(51) Int. Cl.
*H02K 17/08* (2006.01)
*H02K 1/14* (2006.01)
*H02K 1/16* (2006.01)
*H02K 3/00* (2006.01)

(52) U.S. Cl. ... 310/216.071; 310/216.069; 310/216.072; 310/216.073; 310/179; 310/180; 310/184; 310/185; 310/195; 310/198

(58) Field of Classification Search ........... 310/216.071, 310/216.069, 216.072, 216.073, 179, 180, 310/184, 185, 195, 198; *H02K 1/14, 1/16, H02K 17/08*
See application file for complete search history.

(56) References Cited

U.S. PATENT DOCUMENTS
3,614,494 A * 10/1971 Borchers et al. ............... 310/56
(Continued)

FOREIGN PATENT DOCUMENTS
JP  58-26555  2/1983
(Continued)

OTHER PUBLICATIONS
Office Action in KR 10-2007-7012888 dated Nov. 27, 2008, and a Partial English Translation.
(Continued)

*Primary Examiner* — Quyen Leung
*Assistant Examiner* — Michael Andrews
(74) *Attorney, Agent, or Firm* — Buchanan Ingersoll & Rooney PC

(57) ABSTRACT

It is an object to obtain a highly efficient and low-cost single-phase motor by producing the motor in a form that allows a proper material layout, with securing a magnetic path of a coreback of a stator iron core. A stator iron core 1 formed by laminating a plurality of electromagnetic steel sheets and provided with N slots, where N/2 is odd, a part of which are large slots 4 and others are small slots 3 having a shallower depth in a radial direction; a main winding 6 of 2-pole single-phase concentric winding arrangement inserted to the large slots 4 or the small slots 3; and an auxiliary winding 7 of 2-pole single-phase concentric winding arrangement inserted to the large slots 4 or the small slots 3 and arranged at a location which is dislocated by other than 90 degrees in electrical angle from the main winding 6 are included, and among the N slots, slots of which the occupying rate of winding is made smaller than others by arranging the auxiliary winding 7 at a location which is dislocated by other than 90 degrees in electrical angle from the main winding 6 are made the small slots 3, and other slots are made the large slots 4.

15 Claims, 14 Drawing Sheets

U.S. PATENT DOCUMENTS

| | | | | |
|---|---|---|---|---|
| 3,671,790 A | * | 6/1972 | Widstrand | 310/400 |
| 3,783,318 A | * | 1/1974 | Widstrand | 310/216.014 |
| 3,942,055 A | * | 3/1976 | Hoffmeyer | 310/216.111 |
| 3,976,924 A | * | 8/1976 | Vanjani | 318/790 |
| 4,241,274 A | * | 12/1980 | Brammerlo | 310/216.071 |
| 4,982,129 A | * | 1/1991 | Eggert | 310/216.071 |
| 5,668,429 A | * | 9/1997 | Boyd et al. | 310/216.071 |
| 2002/0140309 A1 | * | 10/2002 | Yanashima et al. | 310/162 |

FOREIGN PATENT DOCUMENTS

| | | |
|---|---|---|
| JP | 58-026555 A | 2/1983 |
| JP | 3-265448 A | 11/1991 |

OTHER PUBLICATIONS

Form PCT/ISA/210 (International Search Report) dated Apr. 24, 2006.

Chinese Office Action dated Dec. 18, 2009 and English Translation thereof.

Office Action dated Jul. 26, 2011, issued in the corresponding Japanese Patent Application No. 2006-520468, and an English Translation thereof.

* cited by examiner

Fig. 3

| SLOT NUMBER | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|
| NUMBER OF MAIN WINDINGS | M1 | M2 | M3 | M4 | M5 | M6 | | | | M6 | M5 | M4 | M3 | M2 | M1 |
| NUMBER OF AUXILIARY WINDINGS | | | | | A4 | A3 | A2 | A1 | A1 | A2 | A3 | A4 | | | |

{ LARGE SLOT 4 } { SMALL SLOT 3 } { LARGE SLOT 4 }

Fig. 4

| SLOT NUMBER | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|
| NUMBER OF MAIN WINDINGS | 40 | 40 | 40 | 30 | 20 | 10 | | | | 10 | 20 | 30 | 40 | 40 | 40 |
| NUMBER OF AUXILIARY WINDINGS | | | | | 10 | 20 | 30 | 40 | 40 | 30 | 20 | 10 | | | |
| TOTAL NUMBER OF WINDINGS | 40 | 40 | 40 | 30 | 30 | 30 | 30 | 40 | 40 | 40 | 40 | 40 | 40 | 40 | 40 |

LARGE SLOT 4 | SMALL SLOT 3 | LARGE SLOT 4

Fig. 5

| SLOT NUMBER | S1 | S2 | S3 | S4 | S5 | S6 | S7 | S8 | S9 | S10 | S11 | S12 | S13 |
|---|---|---|---|---|---|---|---|---|---|---|---|---|---|
| NUMBER OF MAIN WINDINGS | M1 | M2 | M3 | M4 | | | | | | M4 | M3 | M2 | M1 |
| NUMBER OF AUXILIARY WINDINGS | | | | | A3 | A2 | A1 | A1 | A2 | A3 | | | |

LARGE SLOT 4 — SMALL SLOT 3 — LARGE SLOT 4

Fig. 6

| SLOT NUMBER | S1 | S2 | S3 | S4 | S5 | S6 | S7 | S8 | S9 | S10 | S11 | S12 | S13 |
|---|---|---|---|---|---|---|---|---|---|---|---|---|---|
| NUMBER OF MAIN WINDINGS | 40 | 40 | 40 | 20 | | | | | | 20 | 40 | 40 | 40 |
| NUMBER OF AUXILIARY WINDINGS | | | | | 20 | 40 | 40 | 40 | 40 | 20 | | | |
| TOTAL NUMBER OF WINDINGS | 40 | 40 | 40 | 20 | 20 | 40 | 40 | 40 | 40 | 40 | 40 | 40 | 40 |

LARGE SLOT 4  SMALL SLOT 3  LARGE SLOT 4

LARGE SLOT 4

Fig. 7

| SLOT NUMBER | S1 | S2 | S3 | S4 | S5 | S6 | S7 | S8 | S9 | S10 | S11 | S12 | S13 | S14 | S15 | S16 | S17 |
|---|---|---|---|---|---|---|---|---|---|---|---|---|---|---|---|---|---|
| NUMBER OF MAIN WINDINGS | M1 | M2 | M3 | M4 | M5 | M6 | | | | | | M6 | M5 | M4 | M3 | M2 | M1 |
| NUMBER OF AUXILIARY WINDINGS | | | | | A5 | A4 | A3 | A2 | A1 | A1 | A2 | A3 | A4 | A5 | | | |

LARGE SLOT 4 — SMALL SLOT 3 — LARGE SLOT 4

Fig. 8

| SLOT NUMBER | S1 | S2 | S3 | S4 | S5 | S6 | S7 | S8 | S9 | S10 | S11 | S12 | S13 | S14 | S15 | S16 | S17 |
|---|---|---|---|---|---|---|---|---|---|---|---|---|---|---|---|---|---|
| NUMBER OF MAIN WINDINGS | 40 | 40 | 40 | 30 | 20 | 10 | | | | | | 10 | 20 | 30 | 40 | 40 | 40 |
| NUMBER OF AUXILIARY WINDINGS | | | | | 10 | 20 | 30 | 40 | 40 | 40 | 40 | 30 | 20 | 10 | | | |
| TOTAL NUMBER OF WINDINGS | 40 | 40 | 40 | 30 | 30 | 30 | 30 | 40 | 40 | 40 | 40 | 40 | 40 | 40 | 40 | 40 | 40 |

LARGE SLOT 4 (S1–S3), SMALL SLOT 3 (S4–S7), LARGE SLOT 4 (S8–S17)

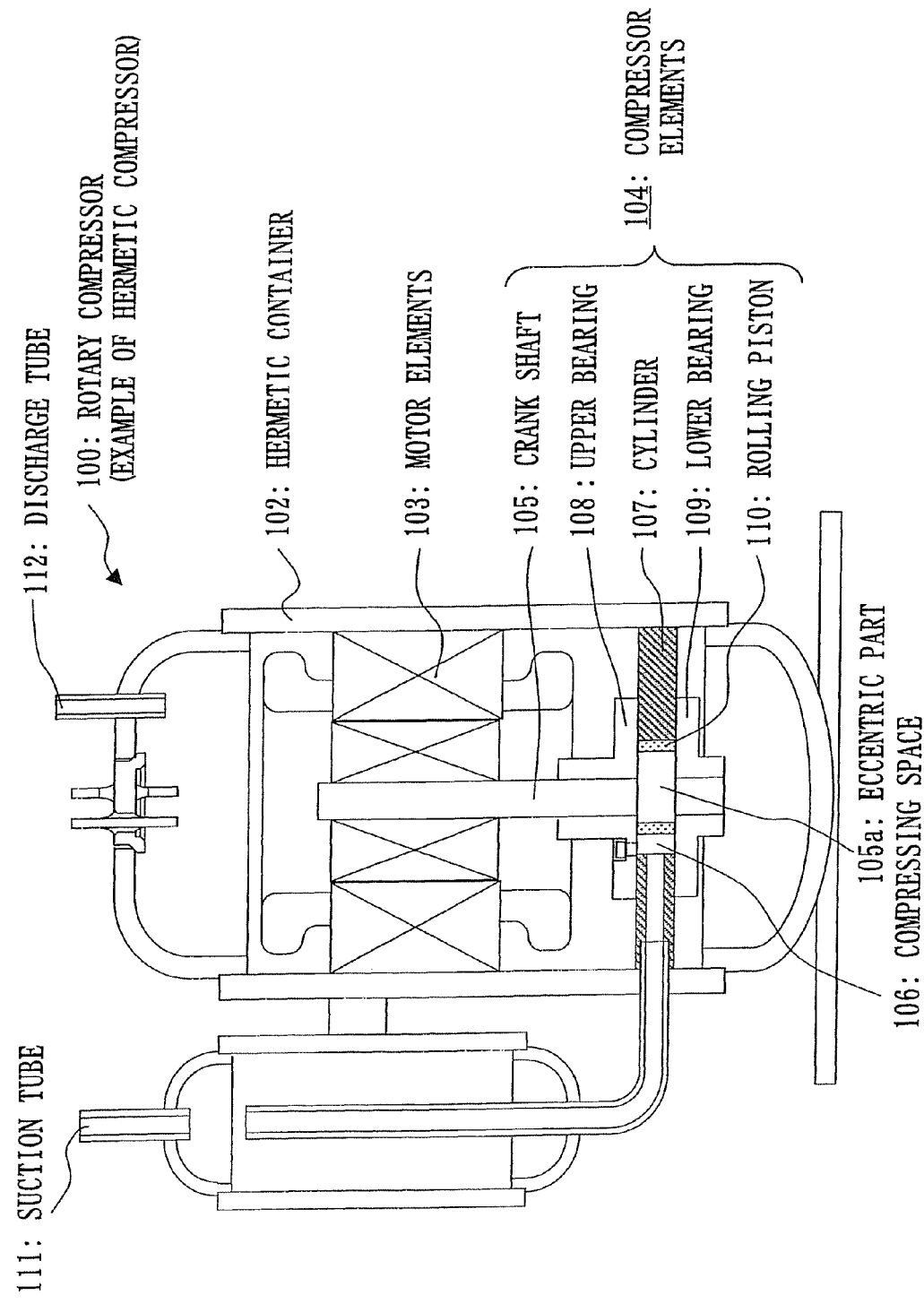

SINGLE-PHASE 2-POLE ELECTRIC MOTOR IN WHICH MAIN WINDINGS AND AUXILIARY WINDINGS ARE MUTUALLY OFFSET BY OTHER THAN 90 DEGREES AND MOUNTED IN DIFFERENT SIZE SLOTS

TECHNICAL FIELD

The present invention relates to a single-phase motor which contains 2-pole single-phase windings and a hermetic compressor.

BACKGROUND ART

In a conventional 2-pole single-phase induction motor, a main winding and an auxiliary winding are arranged concentrically and inserted in slots of a stator iron core formed by laminating steel sheets. The main winding and the auxiliary winding are wound with a mechanical angle (hereinafter, a winding inserting angle) which is an inserting angle of 90 degrees or other than 90 degrees according to the required characteristics.

Even if all of the slots have the same cross section area or if at least two kinds of cross section area of the slots are included, when the arrangement of the slots has an axis of symmetry, the number of windings in the slots results in large differences. Consequently, there is a problem that occupying rate of winding (a rate of cross section area of winding occupied in a slot area) of each slot results in large differences.

Then, in a motor of which the winding inserting angle is other than 90 degrees, a stator iron core of a 2-pole single-phase induction motor has been proposed, which is structured to have a group of plural slots having at least three kinds of cross section areas and further the arrangement of the group of slots does not have an axis of symmetry in order to provide a 2-pole single-phase induction motor in which the cross section areas of the slots are effectively utilized to improve its characteristics (see the Patent Document 1, for example).
Patent Document 1: JP03-265448

DISCLOSURE OF THE INVENTION

Means to Solve the Problems

Since the conventional single-phase motor is arranged not to have an axis of symmetry, there is a problem that vibration noise may increase due to magnetic asymmetric unbalance.

Further, cross section areas of the coreback are unequal, so that the material layout becomes worse, which creates a problem that the motor is expensive.

The present invention is provided to solve the above problems, and aims to obtain a highly efficient and low-cost single-phase motor and a hermetic compressor by producing a stator iron core that allows a proper material layout, with securing a magnetic path of a coreback of a stator iron core.

Means to Solve the Problems

According to the present invention, a single-phase motor includes: a stator iron core formed by laminating a plurality of electromagnetic steel sheets and provided with N slots, where N/2 is odd, a part of which are large slots and others are small slots having a shallower depth in a radial direction; a main winding of 2-pole single-phase concentric winding arrangement inserted to the large slots or the small slots; and an auxiliary winding of 2-pole single-phase concentric winding arrangement inserted to the large slots or the small slots and arranged at a location which is dislocated by other than 90 degrees in electrical angle from the main winding, and an occupying rate of winding is defined as a rate of cross section area of winding occupied in a slot area, and among the N slots, slots of which the occupying rate of winding is made smaller than others by arranging the auxiliary winding at a location which is dislocated by other than 90 degrees in electrical angle from the main winding are made the small slots, and other slots are made the large slots.

Further, a plurality of notches formed as roughly straight lined parts including a large notch provided at an outer circumferential side of the small slots at an outer circumferential part of the stator iron core, and the roughly straight lined part of the large notch provided at the outer circumferential side of the small slots is arranged at a center side of the stator iron core so as to have a larger notched area than other notches.

Further, the large notch provided at the outer circumferential side of the small slots is arranged at a location which is dislocated by 180 degrees in mechanical angle, so that a hexagon which is axisymmetric is formed by straight lines including other notches.

Further, an angle formed by a main winding magnetic pole generated by flowing electric current to the main winding and an auxiliary winding magnetic pole generated by flowing electric current to the auxiliary winding is made at least (90−360/2N) degrees but no more than (90+360/2N) degrees.

Further, the single-phase motor is an induction motor.

Further, the single-phase motor is a synchronous induction motor.

Further, a hermetic compressor includes the single-phase motor.

Effect of the Invention

According to the present invention, it is possible to obtain a highly efficient and low-cost single-phase motor formed by the above structure by producing the motor in a form that allows a proper material layout, with securing a magnetic path of a coreback of a stator iron core.

PREFERRED EMBODIMENTS FOR CARRYING OUT THE INVENTION

Embodiment 1

FIGS. 1 through 8 show the first embodiment. FIG. 1 is a horizontal cross sectional view showing a stator 30 of a single-phase motor; FIG. 2 is an arrangement view of a main winding 6 and an auxiliary winding 7 of concentric winding arrangement; FIG. 3 shows the number of windings including the main winding 6 and the auxiliary winding 7 to be inserted to slots having numbers S1 through S15 when the number of slots is 30; FIG. 4 shows an example of the number of windings including the main winding 6 and the auxiliary winding 7 to be inserted to slots having numbers S1 through S15 when the number of slots is 30; FIG. 5 shows the number of windings including the main winding 6 and the auxiliary winding 7 to be inserted to slots having numbers S1 through S13 when the number of slots is 26; FIG. 6 shows an example of the number of windings including the main winding 6 and the auxiliary winding 7 to be inserted to slots having numbers S1 through S13 when the number of slots is 26; FIG. 7 shows the number of windings including the main winding 6 and the auxiliary winding 7 to be inserted to slots having numbers S1 through S17 when the number of slots is 34; and FIG. 8 shows an example of the number of windings including the main winding 6 and the auxiliary winding 7 to be inserted to slots having numbers S1 through S17 when the number of slots is 34.

The stator 30 shown in FIG. 1 is a stator of a 2-pole single-phase motor. The stator 30 includes a stator iron core 1, a main winding 6 and an auxiliary winding 7 inserted to a large slot 4 and a small slot 3 which are slots of the stator iron core 1. Insulating material is inserted in the slots in order to secure insulation between the windings and the stator iron core 1, but it is omitted here.

The stator iron core 1 is formed by blanking electromagnetic steel sheets having thickness of 0.1 through 1.5 mm into a predetermined shape, laminating in an axial direction, and fixing by caulking or by welding. As for slots to which windings are inserted, the total number of slots is 30, of which the large slots 4 are 22, and the small slots 3 are 8. Further, eleven of the large slots 4 are first formed consecutively, next four of the small slots 3 consecutively, then eleven of the large slots 4 consecutively, and finally four of the small slots 3 consecutively.

A coreback 5 is formed outside of the slots. At an outer circumference of the coreback 5, that is, at an outer circumference of the stator iron core 1, six notches 2 that form roughly straight lined parts by cutting an outer circumferential shape in a roughly straight lined shape are provided. Further, two of the notches 2 are located at an outer circumferential side of the four consecutive small slots 3. The notches 2 are necessary to secure a passage for refrigerant between the stator 30 and a hermetic container when the single-phase motor using the stator 30 of FIG. 1 is used for a hermetic compressor, for example, since the stator 30 is fixed to the hermetic container of the hermetic compressor.

S1 through S15 are slot numbers. There are 30 slots in total, and to 15 of which slot numbers S1 through S15 are assigned as slots for one pole.

A main winding 6 of the concentric winding arrangement for one pole is inserted to S1 through S6, and S10 through S15. A main winding magnetic pole 8, which is generated by flowing electric current to this main winding 6 and symmetrically to this, another main winding 6 placed at the other pole, is directed as shown by an arrow with a broken line in FIG. 1. Since the electric current that runs in the main winding 6 is alternating current, a vector of the main winding magnetic pole 8 changes according to the alternating current.

One side part of the auxiliary winding 7 of the concentric winding arrangement for one pole is inserted to S5 through S8. The other side part of the auxiliary winding 7 of the concentric winding arrangement for the other pole is inserted to S9 through S12. An auxiliary winding magnetic pole 9 generated by flowing electric current to the auxiliary winding 7 for two poles is dislocated by the magnetic pole angle θ from the main winding magnetic pole 8 in a counter rotating direction. Since the alternate current also runs in the auxiliary winding 7, a vector of the auxiliary winding magnetic pole 9 also changes according to the alternate current. The electric current running to the auxiliary winding 7 has forwarded phase than the electric current running to the main winding 6, so that the direction of rotating magnetic field generated by the windings of the stator 30 is counterclockwise. Therefore, the rotating direction of the rotor shown in FIG. 1 is also counterclockwise.

The magnetic pole angle θ, which is a dislocation between the main winding magnetic pole 8 and the auxiliary winding magnetic pole 9, is dislocated by a unit of 0.5 slot in case of the concentric winding arrangement in which the auxiliary windings 7 of both poles are symmetrically inserted to respective slots, since the number of slots for one pole is 15 (an odd number). In case of FIG. 1, the magnetic pole angle θ is 96 degrees that correspond to 8 slots. Namely, the main winding 6 is dislocated from the auxiliary winding 7 by 96 degrees in electrical angle (the same as mechanical angle, since there are two poles).

Due to the rotating magnetic field generated by the stator 30, the magnetic flux density of the coreback 5 tends to increase in particular in case of two-pole rotating magnetic field. When the magnetic flux density becomes too high (saturated), not only iron loss of the coreback 5 but also copper loss is increased due to the increase of electric current running to the main winding 6 and the auxiliary winding 7 that is necessary to generate torque, which degrades the efficiency of the single-phase motor.

By providing four consecutive small slots 3 at two locations of the stator iron core 1, the magnetic path of the coreback 5 can be extended at these locations.

FIG. 2 is an arrangement view of the main winding 6 and the auxiliary winding 7 of the concentric winding arrangement and shows one side of the arrangement for one pole of the main winding 6 and two poles of the auxiliary winding 7. The main winding 6 is six layer concentric winding; the outermost first coil m1 is inserted to S1 and S15; the second coil m2 is to S2 and S14; the third coil m3 is to S3 and S13; the fourth coil m4 is to S4 and S12; the fifth coil m5 is to S5 and S11; and the sixth coil m6 is to S6 and S10.

The auxiliary winding 7 is four layer concentric winding; respective one side of the outermost two first coils a1 is inserted to S8 and S9; respective one side of the second coil a2 is to S7 and S10; respective one side of the two third coil a3 is to S6 and S11; and the two fourth coil a4 is to S5 and S12.

FIG. 3 shows the number of windings including the main winding 6 and the auxiliary winding 7 to be inserted to the slots numbered S1 through S15. It is assumed that the number of windings of the first coil m1 of the main winding 6 is M1, the number of windings of the second coil m2 is M2, the number of windings of the third coil m3 is M3, the number of windings of the fourth coil m4 is M4, the number of windings of the fifth coil m5 is M5, and the number of windings of the sixth coil m6 is M6. Further, it is assumed that the number of windings of the first coil a1 of the auxiliary winding 7 is A1, the number of windings of the second coil a2 is A2, the number of windings of the third coil a3 is A3, and the number of windings of the fourth coil a4 is A4.

The following relationship is made among the number of windings of each coil of the main winding 6 and the auxiliary winding 7. This is done in order to approximate the wave form of magnetomotive force to the sine wave in case of flowing electric current to each winding.

$$M1 \geq M2 \geq M3 \geq M4 \geq M5 \geq M6$$

$$A1 \geq A2 \geq A3 \geq A4$$

To the slot numbered S4, only M4 pieces of the fourth coil m4 of the main winding 6 are inserted; however, to the slot numbered S12, "M4 pieces of the fourth coil m4 of the main winding 6"+"A4 pieces of the fourth coil a4 of the auxiliary winding 7" are inserted. If S4 has the same area as S12, S4 has more vacancy (space) corresponding to A4 pieces of the fourth coil a4 of the auxiliary winding 7 compared with S12, which causes a problem that the occupying rate of winding of S4 is lower than S12. Accordingly, as shown in FIG. 3, S4 is made a small slot 3 and S12 is made a large slot 4.

To the slot numbered S5, "M5 pieces of the fifth coil m5 of the main winding 6"+"A4 pieces of the fourth coil a4 of the auxiliary winding 7" are inserted; however, to the slot numbered S11, "M5 pieces of the fifth coil m5 of the main winding 6"+"A3 pieces of the third coil a3 of the auxiliary winding 7" are inserted.
Since $$M5+A4 \leqq M5+A3,$$

as shown in FIG. 3, S5 is made a small slot 3 and S11 is made a large slot 4.

To the slot numbered S6, "M6 pieces of the sixth coil m6 of the main winding 6"+"A3 pieces of the third coil a3 of the auxiliary winding 7" are inserted; however, to the slot numbered S10, "M6 pieces of the sixth coil m6 of the main winding 6"+"A2 pieces of the second coil a2 of the auxiliary winding 7" are inserted.
Since $$M6+A3 \leqq M6+A2,$$

as shown in FIG. 3, S6 is made a small slot 3 and S10 is made a large slot 4.

To the slot numbered S7, only A2 pieces of the second coil a2 of the auxiliary winding 7 are inserted, and its occupying rate of winding is lower than S10, so that S7 is made a small slot 3.

Further, to the slots numbered S1 and S15, M1 pieces of the first coil m1 of the main winding 6 are inserted, so that S1 and S15 are made large slots 4.

Further, to the slots numbered S2 and S14, M2 pieces of the second coil m2 of the main winding 6 are inserted, and M2 is a number close to M1, so that S2 and S14 are made large slots 4.

Further, to the slots numbered S3 and S13, M3 pieces of the third coil m3 of the main winding 6 are inserted, and M3 is a number close to M2, so that S3 and S13 are made large slots 4.

Further, to the slots numbered S8 and S9, A1 pieces of the first coil a1 of the auxiliary winding 7 are inserted, and if the wire diameter of the windings are the same, A1 is a roughly the same pieces as M1, so that S8 and S9 are made large slots 4.

Since the stator 30 as a whole has two poles, there is another set of slots (15 slots) which are the same as the slots numbered S1 through S15 for one pole. As a result, there are 22 large slots 4 and 8 small slots in the stator 30 as a whole.

FIG. 4 shows an example of the number of windings including the main winding 6 and the auxiliary winding 7 to be inserted to the slots numbered S1 through S15. In this example, the windings of the main winding 6 and the auxiliary winding 7 have the same wire diameter. The total number of the number of the main windings and the number of auxiliary windings is 40 for the large slot 4, and 30 for the small slot 3. The area of the small slot 3 can be reduced from the area of the large slot 4 at this rate of the number of windings. The area of the slot is changed by changing the depth of the slot in the radial direction.

In the above explanation, the number of slots is 30, the number of layers of the main winding 6 is 6, and the number of layers of the auxiliary winding 7 is 4. Another example will be explained.

FIG. 5 shows the number of windings including the main winding 6 and the auxiliary winding 7 to be inserted to the slots numbered S1 through S13 when the number of slots is 26. The number of layers of the concentric winding of the main winding 6 is 4, and the number of layers of the concentric winding of the auxiliary winding 7 is 3.

It is assumed that the number of windings of the first coil m1 of the main winding 6 is M1, the number of windings of the second coil m2 is M2, the number of windings of the third coil m3 is M3, and the number of windings of the fourth coil m4 is M4. Further, it is assumed that the number of windings of the first coil a1 of the auxiliary winding 7 is A1, the number of windings of the second coil a2 is A2, and the number of windings of the third coil a3 is A3.

The following relationship is made among the number of windings of each coil of the main winding 6 and the auxiliary winding 7:

$$M1 \geqq M2 \geqq M3 \geqq M4$$

$$A1 \geqq A2 \geqq A3$$

To the slot numbered S4, only M4 pieces of the fourth coil m4 of the main winding 6 are inserted; however, to the slot numbered S10, "M4 pieces of the fourth coil m4 of the main winding 6"+"A3 pieces of the third coil a3 of the auxiliary winding 7" are inserted. If S4 has the same area as S10, S4 has more vacancy (space) corresponding to A3 pieces of the third coil a3 of the auxiliary winding 7 compared with S10, which causes a problem that the occupying rate of winding of S4 is lower than S10. Accordingly, as shown in FIG. 5, S4 is made a small slot 3 and S10 is made a large slot 4.

To the slot numbered S5, only A3 pieces of the third coil a3 of the auxiliary winding 7 are inserted; however, to the slot numbered S10, "M4 pieces of the fourth coil m4 of the main winding 6"+"A3 pieces of the third coil a3 of the auxiliary winding 7" are inserted. If S5 has the same area as S10, S5 has more vacancy (space) corresponding to M4 pieces of the fourth coil m4 of the main winding 6 compared with S10, which causes a problem that the occupying rate of winding of S5 is lower than S10. Accordingly, as shown in FIG. 5, S5 is made a small slot 3 and S10 is made a large slot 4.

Further, to the slots numbered S1 and S13, M1 pieces of the fist coil m1 of the main winding 6 are inserted, so that S1 and S13 are made large slots 4.

Further, to the slots numbered S2 and S12, M2 pieces of the second coil m2 of the main winding 6 are inserted, and M2 is a number close to M1, so that S2 and S12 are made large slots 4.

Further, to the slots numbered S3 and S11, M3 pieces of the third coil m3 of the main winding 6 are inserted, and M3 is a number close to M2, so that S3 and S11 are made large slots 4.

Further, to the slots numbered S7 and S8, A1 pieces of the first coil a1 of the auxiliary winding 7 are inserted, and if the wire diameter of the windings are the same, A1 is roughly the same pieces as M1, so that S7 and S8 are made large slots 4.

Further, to the slots numbered S6 and S9, A2 pieces of the second coil a2 of the auxiliary winding 7 are inserted, and A2 is a number close to A1, so that S6 and S9 are made large slots 4.

Since the stator 30 as a whole has two poles, there is another set of slots (13 slots) which are the same as the slots numbered S1 through S13 for one pole. As a result, there are 22 large slots 4 and 4 small slots in the stator 30 as a whole.

FIG. 6 shows an example of the number of windings including the main winding 6 and the auxiliary winding 7 to be inserted to the slots numbered S1 through S13. In this example, the windings of the main winding 6 and the auxiliary winding 7 have the same wire diameter. The total number of the number of the main windings and the number of auxiliary windings is 40 for the large slot 4 and 20 for the small slot 3. The area of the small slot 3 can be reduced from the area of the large slot 4 at this rate of the number of windings. The area of the slot is changed by changing the depth of the slot in the radial direction.

FIG. 7 shows the number of windings including the main winding 6 and the auxiliary winding 7 to be inserted to the slots numbered S1 through S17 when the number of slots is 34. The number of layers of the concentric winding of the main winding 6 is 6, and the number of layers of the concentric winding of the auxiliary winding 7 is 5.

It is assumed that the number of windings of the first coil m1 of the main winding 61 is M1, the number of windings of the second coil m2 is M2, the number of windings of the third coil m3 is M3, the number of windings of the fourth coil m4 is M4, the number of windings of the fifth coil m5 is M5, and the number of windings of the sixth coil m6 is M6. Further, it is assumed that the number of windings of the first coil a1 of the auxiliary winding 7 is A1, the number of windings of the second coil a2 is A2, the number of windings of the third coil a3 is A3, the number of windings of the second coil a4 is A4, and the number of windings of the fifth coil a5 is A5.

The following relationship is made among the number of windings of each coil of the main winding 6 and the auxiliary winding 7:

$$M1 \geq M2 \geq M3 \geq M4 \geq M5 \geq M6$$

$$A1 \geq A2 \geq A3 \geq A4 \geq A5$$

To the slot numbered S4, only M4 pieces of the fourth coil m4 of the main winding 6 are inserted; however, to the slot numbered S14, "M4 pieces of the fourth coil m4 of the main winding 6"+"A5 pieces of the fifth coil a5 of the auxiliary winding 7" are inserted. If S4 has the same area as S14, S4 has more vacancy (space) corresponding to A5 pieces of the fifth coil a5 of the auxiliary winding 7 compared with S14, which causes a problem that the occupying rate of winding of S4 is lower than S14. Accordingly, as shown in FIG. 7, S4 is made a small slot 3 and S14 is made a large slot 4.

To the slot numbered S5, "M5 pieces of the fifth coil m5 of the main winding 6"+"A5 pieces of the fifth coil a5 of the auxiliary winding 7" are inserted; however, to the slot numbered S13, "M5 pieces of the fifth coil m5 of the main winding 6"+"A4 pieces of the fourth coil a4 of the auxiliary winding 7" are inserted.
Since $$M5+A5 \leq M5+A4,$$

as shown in FIG. 7, S5 is made a small slot 3 and S13 is made a large slot 4.

To the slot numbered S6, "M6 pieces of the sixth coil m6 of the main winding 6"+"A4 pieces of the fourth coil a4 of the auxiliary winding 7" are inserted; however, to the slot numbered S12, "M6 pieces of the fifth coil m6 of the main winding 6"+"A3 pieces of the third coil a3 of the auxiliary winding 7" are inserted.
Since $$M5+A4 \leq M5+A3,$$

as shown in FIG. 7, S6 is made a small slot 3 and S12 is made a large slot 4.

To the slot numbered S7, A3 pieces of the third coil a3 of the auxiliary winding 7 are inserted; however, to the slot numbered S12, "M6 pieces of the sixth coil m6 of the main winding 6"+"A3 pieces of the third coil a3 of the auxiliary winding 7" are inserted. If S7 has the same area as S12, S7 has more vacancy (space) corresponding to M6 pieces of the sixth coil m6 of the main winding 6 compared with S12, which causes a problem that the occupying rate of winding of S5 is lower than S12. Accordingly, as shown in FIG. 7, S7 is made a small slot 3.

Further, to the slots numbered S1 and S17, M1 pieces of the fist coil m1 of the main winding 6 are inserted, so that S1 and S17 are made large slots 4.

Further, to the slots number S2 and S16, M2 pieces of the second coil m2 of the main winding 6 are inserted, and M2 is a number close to M1, so that S2 and S16 are made large slots 4.

Further, to the slots numbered S3 and S15, M3 pieces of the third coil m3 of the main winding 6 are inserted, and M3 is a number close to M2, so that S3 and S15 are made large slots 4.

Further, to the slots numbered S9 and S10, A1 pieces of the first coil a1 of the auxiliary winding 7 are inserted, and if the wire diameter of the windings are the same, A1 is roughly the same pieces as M1, so that S9 and S10 are made large slots 4.

Further, to the slots numbered S8 and S11, A2 pieces of the second coil a2 of the auxiliary winding 7 are inserted, and A2 is a number close to A1, so that S8 and S11 are made large slots 4.

Since the stator 30 as a whole has two poles, there is another set of slots (17 slots) which are the same as the slots numbered S1 through S17 for one pole. As a result, there are 26 large slots 4 and 8 small slots 3 in the stator 30 as a whole.

FIG. 8 shows an example of the number of windings including the main winding 6 and the auxiliary winding 7 to be inserted to the slots numbered S1 through S17. In this example, the windings of the main winding 6 and the auxiliary winding 7 have the same wire diameter. The total number of the number of the main windings and the number of auxiliary windings is 40 for the large slot 4 and 20 for the small slot 3. The area of the small slot 3 can be reduced from the area of the large slot 4 at this rate of the number of windings. The area of the slot is changed by changing the depth of the slot in the radial direction.

To have the slot of which the occupying rate of winding is low means to have useless space in the motor, which equals to reducing the cross section of the coreback. Accordingly, the magnetic flux density of the coreback 5 becomes high, and as a result, the efficiency of the single-phase motor is degraded.

In the present embodiment, the slots S4 through S7 of which the occupying rate of winding is low in the case of FIG. 3, the slots S4 and S5 of which the occupying rate of winding is low in the case of FIG. 5, and the slots S4 through S7 of which the occupying rate of winding is low in the case of FIG. 7 are made small slots 3 by reducing the depth of the slots in the radial direction, so that the magnetic path of the coreback 5 can be extended, which secures the cross section area of the coreback so as not to make the magnetic flux density saturated. By moderating the magnetic flux density, the increase of iron loss and copper loss can be prevented, and a highly efficient single-phase motor can be obtained. Or, if the efficiency is the same as the conventional single-phase motor, the width of the core can be reduced in the axial direction, which enables to reduce the size and the weight of the single-phase motor.

When the single-phase motor is mounted on a compressor, it is possible to obtain a highly efficient compressor, since the motor to be mounted is highly efficient, and further it is also possible to accomplish energy conservation by employing the compressor in an air conditioner and a fridge freezer.

In the present embodiment, the case in which the total number of the slots is 30, the number of layers of the main winding is 6, and the number of layers of the auxiliary winding is 4; the case in which the total number of the slots is 26, the number of layers of the main winding is 4, and the number of layers of the auxiliary winding is 3; and the case in which the total number of the slots is 34, the number of layers of the main winding is 6, and the number of layers of the auxiliary winding is 5 have been discussed; however, in case of another type of combinations, it is also possible to obtain the same effect by setting an appropriate number of small slots according to the number of the slots and the number of layers of the windings.

Embodiment 2

FIGS. 9 through 11 show the second embodiment: FIG. 9 is a horizontal cross sectional view showing a stator 40 of a single-phase motor; FIG. 10 is a horizontal cross sectional view of the stator 40 of a single-phase motor used for an induction motor 50 (an example of a single-phase motor); and FIG. 11 is a horizontal cross sectional view of the stator 40 of a single-phase motor used for a synchronous induction motor 60 (an example of a single-phase motor).

As shown in FIG. 9, two notches 2 located at an outer circumferential side of four consecutive small slots 3 among the notches 2 of FIG. 1 are made large so as to become large notches 21. At this time, a roughly straight lined part of the large notch 21 is moved to the center side of a stator iron core 1 so as to increase the area. A point that is different from FIG. 1 is only a part of the large notch 21.

The magnetic flux density of the coreback 5 located at the outer circumferential part of the small slot 3 is low compared with the coreback 5 located at the outer circumferential part of the large slot 4, since the cross section area of the coreback is increased. In this embodiment, the large notch 21 is provided so as to increase a notched area within an extent so as not to make the magnetic flux density saturated. By providing the large notch 21, total area of all the notches is increased.

The total notched area is important especially in case of using the single-phase motor for a hermetic compressor. When the single-phase motor is used for the hermetic compressor, since the two large notches 21 and the four notches 2 become a passage for the refrigerant, the performance of the hermetic compressor is degraded if the total notched area is decreased.

Since the total notched area is increased due to the large notch 21, it is possible to prevent the degradation of the performance of the hermetic compressor.

Further, if the total notched area of the stator 40 in FIG. 9 is made the same as the total notched area of the stator 30 in FIG. 1, the area of the notch 2 at the outer circumferential part of the large slot 4 is decreased (the roughly straight lined part is arranged at the outer circumferential side of the stator iron core 1), so that it is possible to increase the cross section area of the coreback at the outer circumferential part of the large slot 4. Because of this, a highly efficient single-phase motor can be obtained, in which the magnetic flux density of the coreback is further moderated.

Further, in the present embodiment, the two large notches 21 having large notched area are dislocated by 180 degrees in mechanical angle, and the roughly straight lined parts including other notches 2 form a rough hexagon. By distributing the notches to six locations, it is possible to reduce the notched area, in particular the area of the notch 2 located at the outer circumferential side of the large slot 4, so that the cross section area of the coreback can be secured. Accordingly, the magnetic flux density can be moderated, and at the same time, it is possible to improve material layout of the stator iron core 1, so that a low-cost single-phase motor can be obtained.

If the notches are further distributed, the contacting area with the cylindrical hermetic container of the hermetic compressor is reduced, and at the same time, the number of contacting points is increased, so that the energy which transmits electromagnetic vibration generated by the stator 40 can be distributed, which enables to obtain a single-phase motor with lower vibration and lower noise. In particular, in a 2-pole single-phase motor, the magnetic field generated by the stator 40 becomes distorted ellipse magnetic field compared with the circular rotating magnetic field, which may increase the electromagnetic noise; and thus further effect can be obtained by the single-phase motor of the embodiment.

FIG. 10 shows a horizontal cross sectional view of the stator 40 of a single-phase motor used for an induction motor 50. The rotor iron core 10 of the rotor 15 includes 38 rotor slots 11 into which aluminum or copper which is conductive material is casted. However, the number of slots of the rotor slots 11 can be other than 38. The rotational direction of the rotor 15 of the induction motor 50 is counterclockwise as shown in FIG. 10. Further, the magnetic pole angle $\theta$ is 96 degrees of the main winding magnetic pole 8 in respect of the auxiliary winding magnetic pole 9.

When the stator 40 of the single-phase motor of the embodiment is used for the induction motor 50, by moderating the magnetic flux density of the coreback as discussed above, the electric current running in the main winding 6 and the auxiliary winding 7 can be reduced at the same torque, which enables to obtain a highly efficient single-phase induction motor 50.

Further, FIG. 11 shows a horizontal cross sectional view of the stator 40 of a single-phase motor used for a synchronous induction motor 60. The rotor iron core 10 of the rotor 16 includes the rotor slot 11 and the rotor slit 12 to which aluminum or copper which is conductive material is casted. One rotor slit 12 is connected to two rotor slots 11 located at both ends. Here, explanation is done for a case in which to both of the rotor slot 11 and the rotor slit 12, aluminum is casted; however, the same effect can be obtained even if the conductive material is not casted into the rotor slit 12. The rotational direction of the rotor 16 of the synchronous induction motor 60 is counterclockwise as shown in FIG. 11. Further, the magnetic pole angle $\theta$ is 96 degrees of the main winding magnetic pole 8 in respect of the auxiliary winding magnetic pole 9.

The synchronous induction motor 60 rotates synchronously to the rotating magnetic field generated by the stator 40 at the time of normal operation, so that the magnetic flux density of the coreback tends to become higher than the induction motor 50. By employing the stator 40 of the single-phase motor of the embodiment for the synchronous induction motor 60, it is possible to reduce the magnetic flux density of the coreback, which enables to obtain a further highly efficient single-phase synchronous induction motor 60.

Embodiment 3

FIGS. 12 and 13 show the third embodiment: FIG. 12 shows torque characteristics in respect of the revolution of a single-phase induction motor 50; and FIG. 13 shows motor efficiency characteristics in respect of a magnetic pole angle of a single-phase induction motor 50.

In FIG. 10, the case has been explained, in which the magnetic pole angle $\theta$ of the main winding magnetic pole 8 in respect of the auxiliary winding magnetic pole 9 is 96 degrees (the dislocation of windings between the main winding 6 and the auxiliary winding 7 is 96 degrees in electrical angle). It is also possible to make the magnetic pole angle $\theta$ 84 degrees (corresponding to 7 slots out of total 30 slots) by dislocating the winding arrangement.

As shown in FIG. 12, it is found that the torque is increased in the case of 96 degrees compared with the case of the magnetic pole angle θ=84 degrees. That the torque is increased means that the revolution is increased in the case of 96 degrees under the condition of the same torque in an area in which the revolution is higher than the maximum torque. The revolution is high, namely, the slip is small, so that the secondary copper loss decreases at the rotor, and it is possible to obtain a highly efficient induction motor 50.

Further, it is also possible to make the magnetic pole angle θ=72 degrees that is 6 slots dislocation or θ=108 degrees that is 9 slots dislocation by changing the winding arrangement. However, when the magnetic pole angle is made too large or too small compared with 90 degrees, the wire diameter of windings must be decreased when the number of main windings and the number of auxiliary winding are the same as the case of FIG. 3, since the number of slots to which both of the main winding 6 and the auxiliary winding 7 are inserted is increased.

FIG. 13 shows motor efficiency characteristics in respect of a magnetic pole angle θ. In cases of θ=72 degrees and 108 degrees, the wire diameter must be decreased as discussed above, so that the winding resistance is increased, the copper loss is increased accordingly, and it is found the efficiency is degraded drastically.

In case of N=30 slots, by setting the magnetic pole angle θ to between 90−360/2N=84 degrees and 90+360/2N=96 degrees, it is possible to insert sufficient number of windings to generate torque without increasing the winding resistance, which enables to obtain a highly efficient single-phase induction motor 50.

Here, although the case of N=30 slots has been explained, it is also possible to obtain the same effect in case of another number of slots N (N/2 is an odd number) by setting the magnetic pole angle θ to between 90−360/2N and 90+360/2N.

Embodiment 4

FIG. 14 shows the fourth embodiment and is a vertical cross sectional view of a rotary compressor 100 (an example of a hermetic compressor).

In FIG. 14, motor elements 103 and compressor elements 104 are contained in a hermetic container 102 of the rotary compressor 100 (an example of a hermetic compressor). The induction motor 50 or the synchronous induction motor 60 shown in the second or the third embodiment is used for the motor elements 103.

The compressor elements 104 include a crank shaft 105 driven by the motor elements 103, a cylinder 107 which forms a compressing space 106 that is concentric with the crank shaft 105 at an inner circumferential part, an upper bearing 108 and a lower bearing 109 which support the top and the bottom of the cylinder 107, and a rolling piston 110 mounted to an eccentric part 105a of the crank shaft 105 and moves eccentrically in the cylinder 107.

A suction tube 111 is connected to an evaporator of a refrigeration cycle and guides the refrigerant into the cylinder 107. A discharge tube 112 is connected to a condenser of the refrigeration cycle and sends out high-pressure refrigerant in the hermetic container 102 to the refrigerant cycle.

When the induction motor 50 or the synchronous induction motor 60 discussed in the second or the third embodiment is mounted on the rotary compressor 100, it is possible to obtain a highly efficient rotary compressor 100, since the induction motor 50 or the synchronous induction motor 60 to be mounted is highly efficient, and further it is also possible to accomplish energy conservation by employing the rotary compressor 100 in an air conditioner and a fridge freezer.

BRIEF EXPLANATION OF THE DRAWINGS

FIG. 3 shows the first embodiments and shows the number of windings including the main winding 6 and the auxiliary winding 7 to be inserted to slots numbered S1 through S15 when the number of slots is 30.

FIG. 4 shows the first embodiment and shows an example of the number of windings including the main winding 6 and the auxiliary winding 7 to be inserted to slots numbered S1 through S15 when the number of slots is 30.

FIG. 5 shows the first embodiment and shows the number of windings including the main winding 6 and the auxiliary winding 7 to be inserted to slots numbered S1 through S13 when the number of slots is 26.

FIG. 6 shows the first embodiment and shows an example of the number of windings including the main winding 6 and the auxiliary winding 7 to be inserted to slots numbered S1 through S13 when the number of slots is 26.

FIG. 7 shows the first embodiment and shows the number of windings including the main winding 6 and the auxiliary winding 7 to be inserted to slots numbered S1 through S17 when the number of slots is 34.

FIG. 8 shows the first embodiment and shows an example of the number of windings including the main winding 6 and the auxiliary winding 7 to be inserted to slots numbered S1 through S17 when the number of slots is 34.

FIG. 14 shows the fourth embodiment and is a vertical cross sectional view of a rotary compressor 100.

EXPLANATION OF SIGNS

Figure 1:
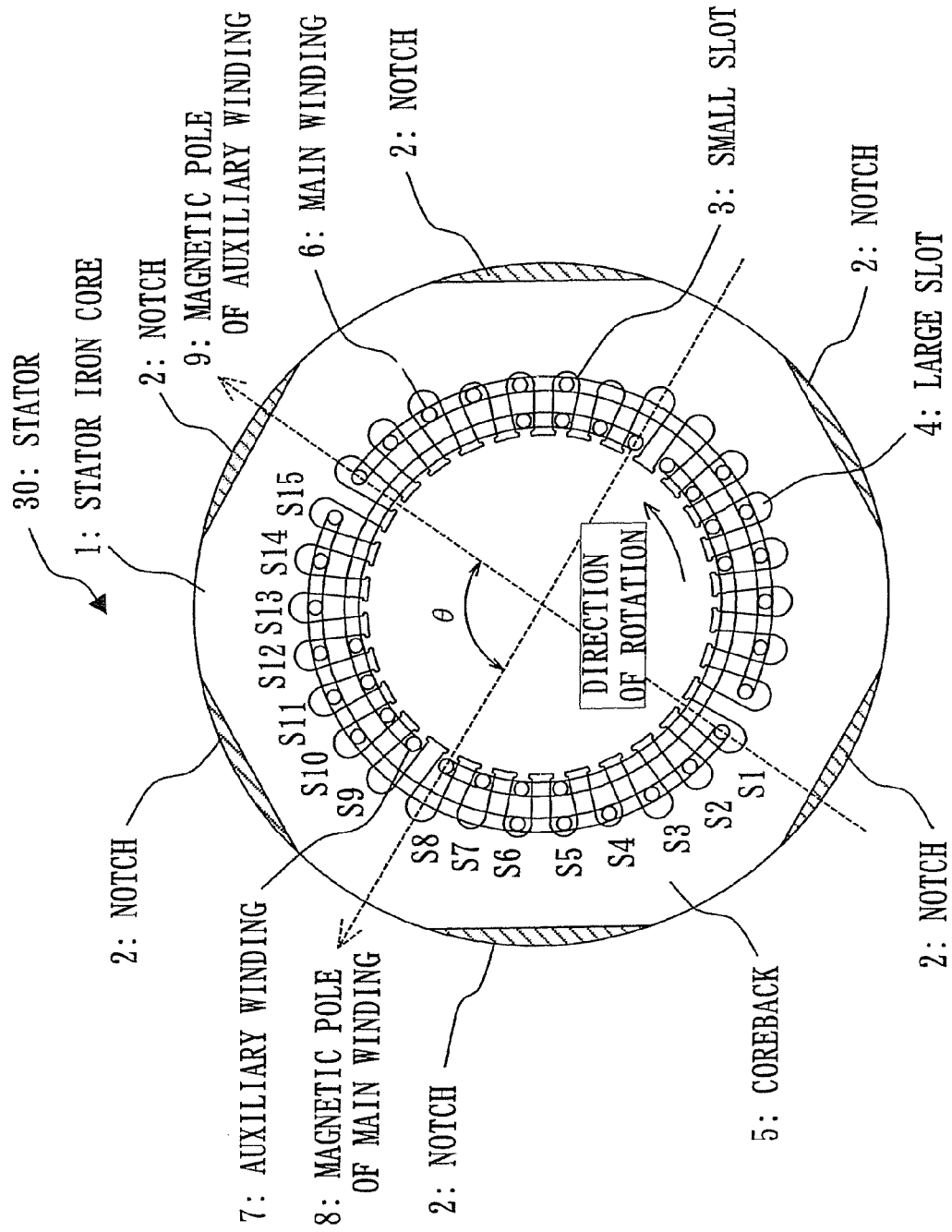
FIG. 1 shows the first embodiment and is a horizontal cross sectional view showing a stator 30 of the single-phased motor.
Figure 2:
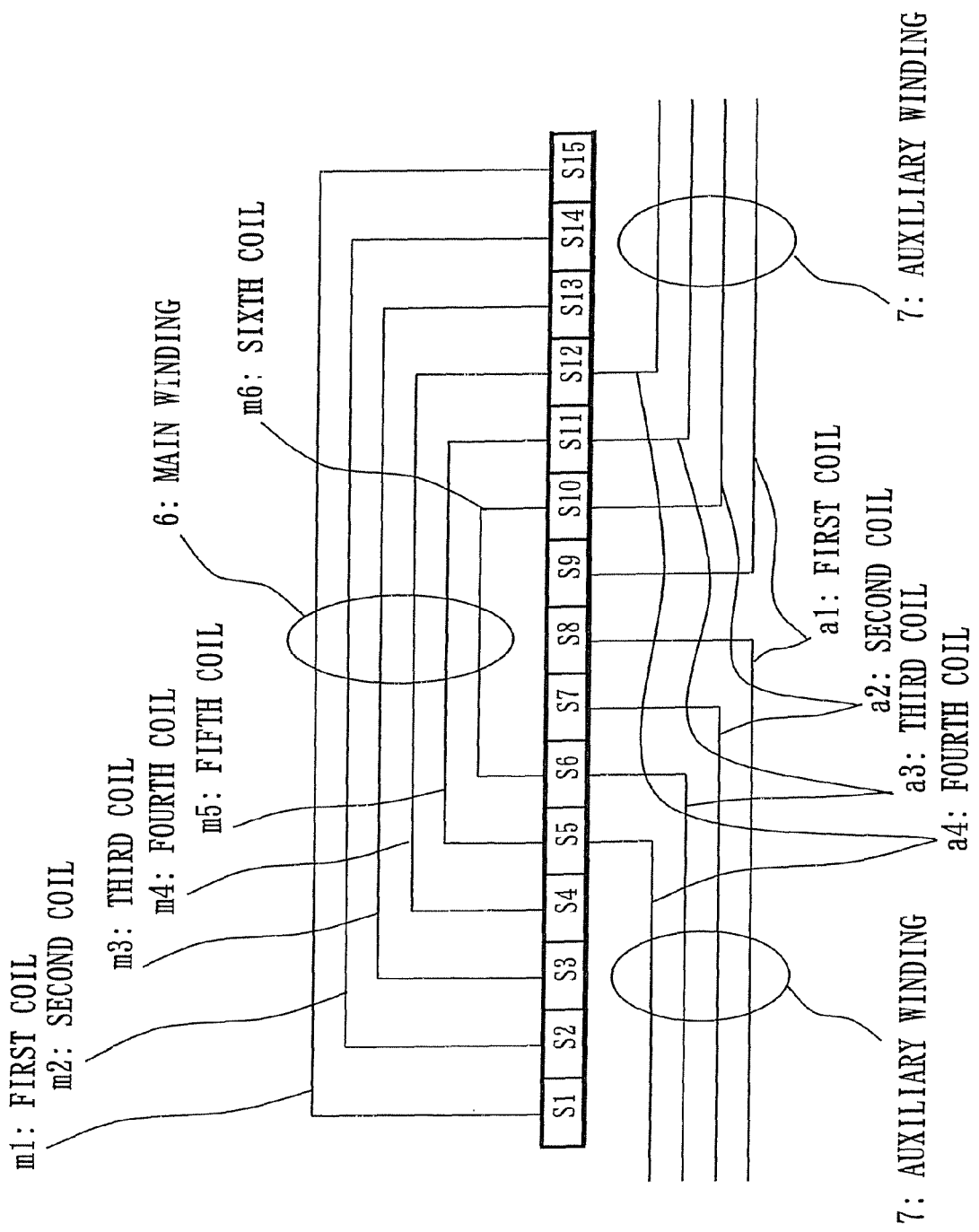
FIG. 2 shows the first embodiment and an arrangement view of a main winding 6 and an auxiliary winding of concentric winding arragement.
Figure 9:
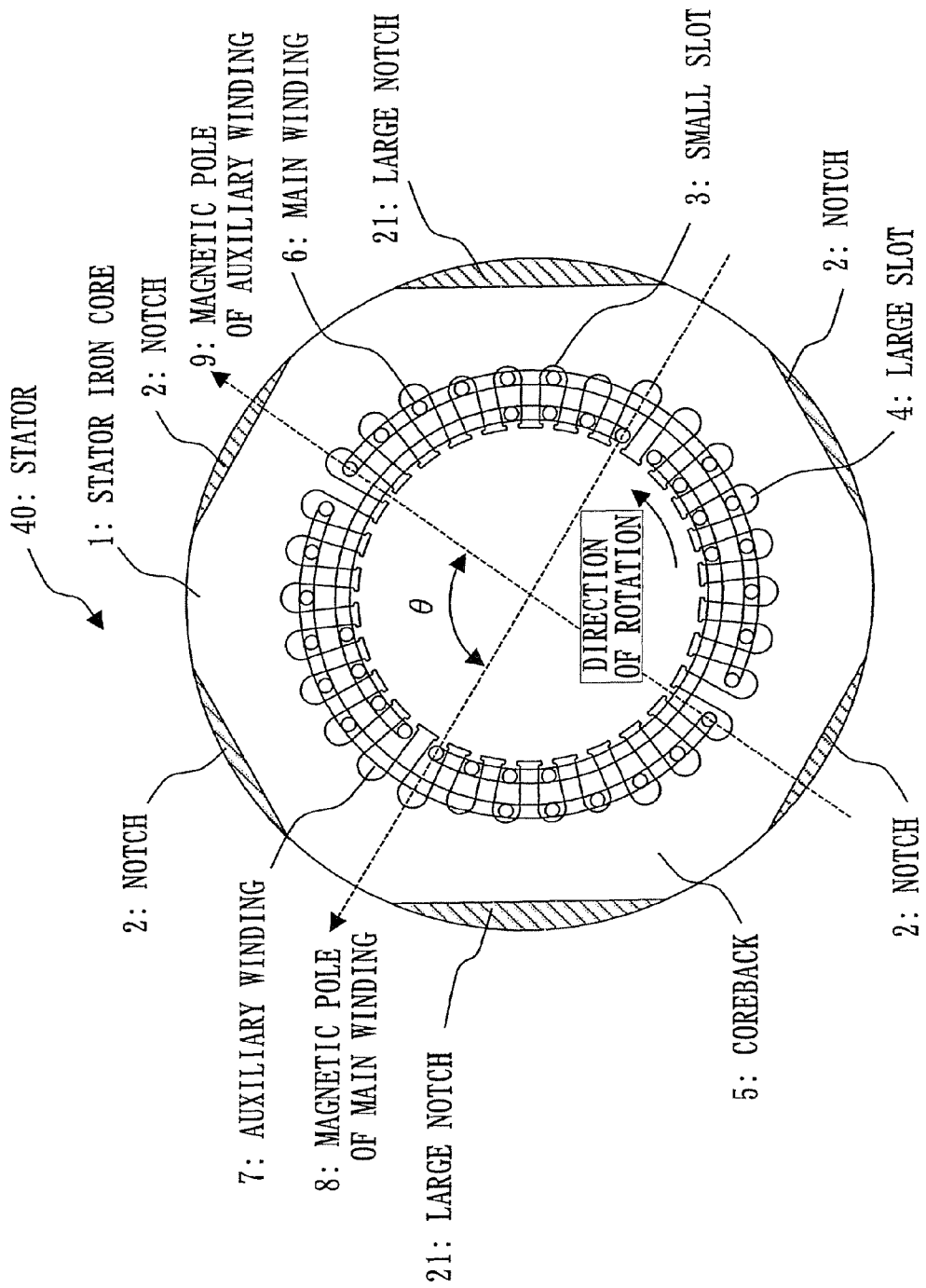
FIG. 9 shows the second embodiment and is a horizontal cross sectional view showing a stator 40 of a single-phased motor.
Figure 10:
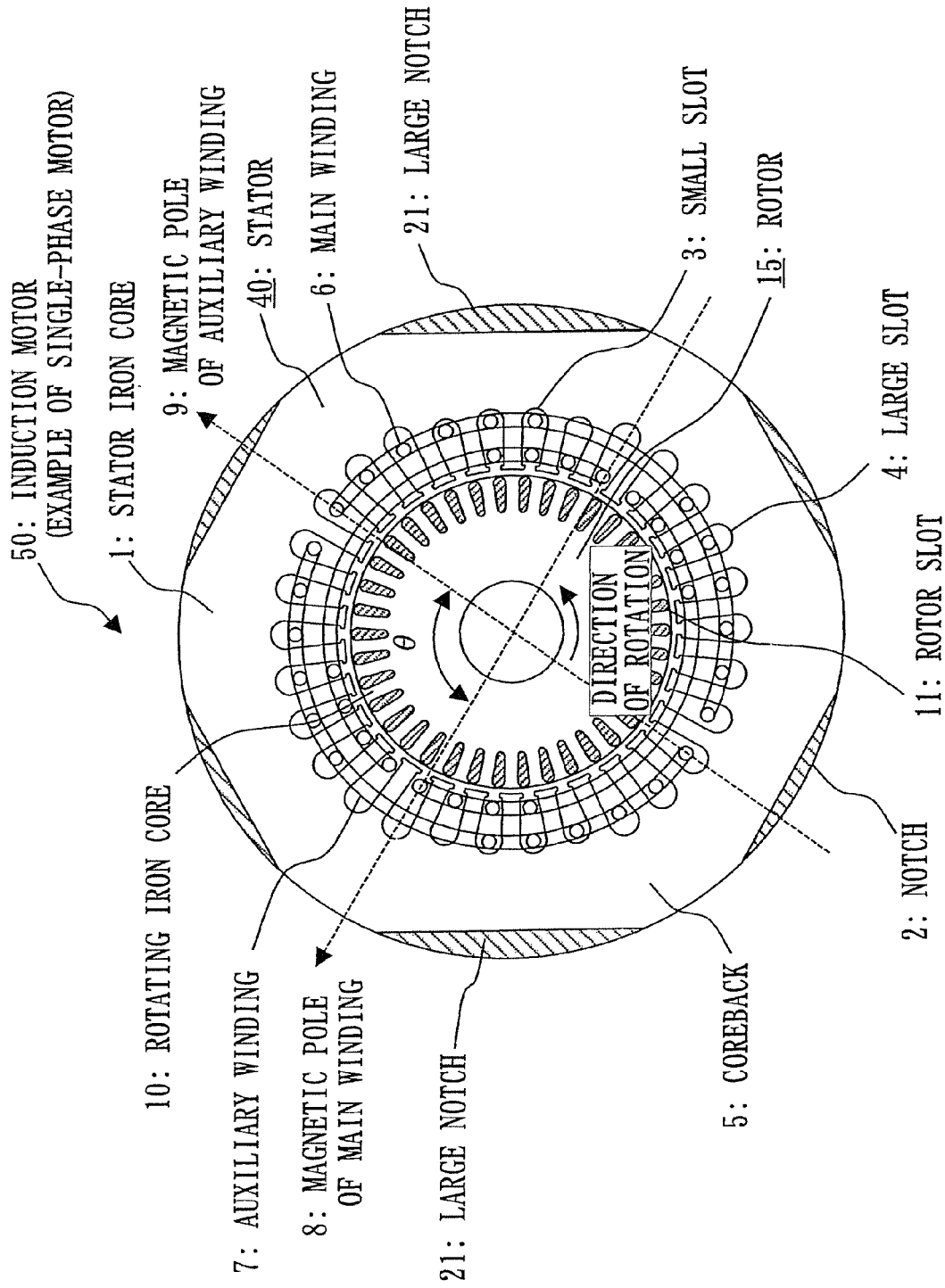
FIG. 10 shows the second embodiment and is a horizontal cross sectional view of the stator 40 of a single-phased motor used for an induction motor 50.
Figure 11:
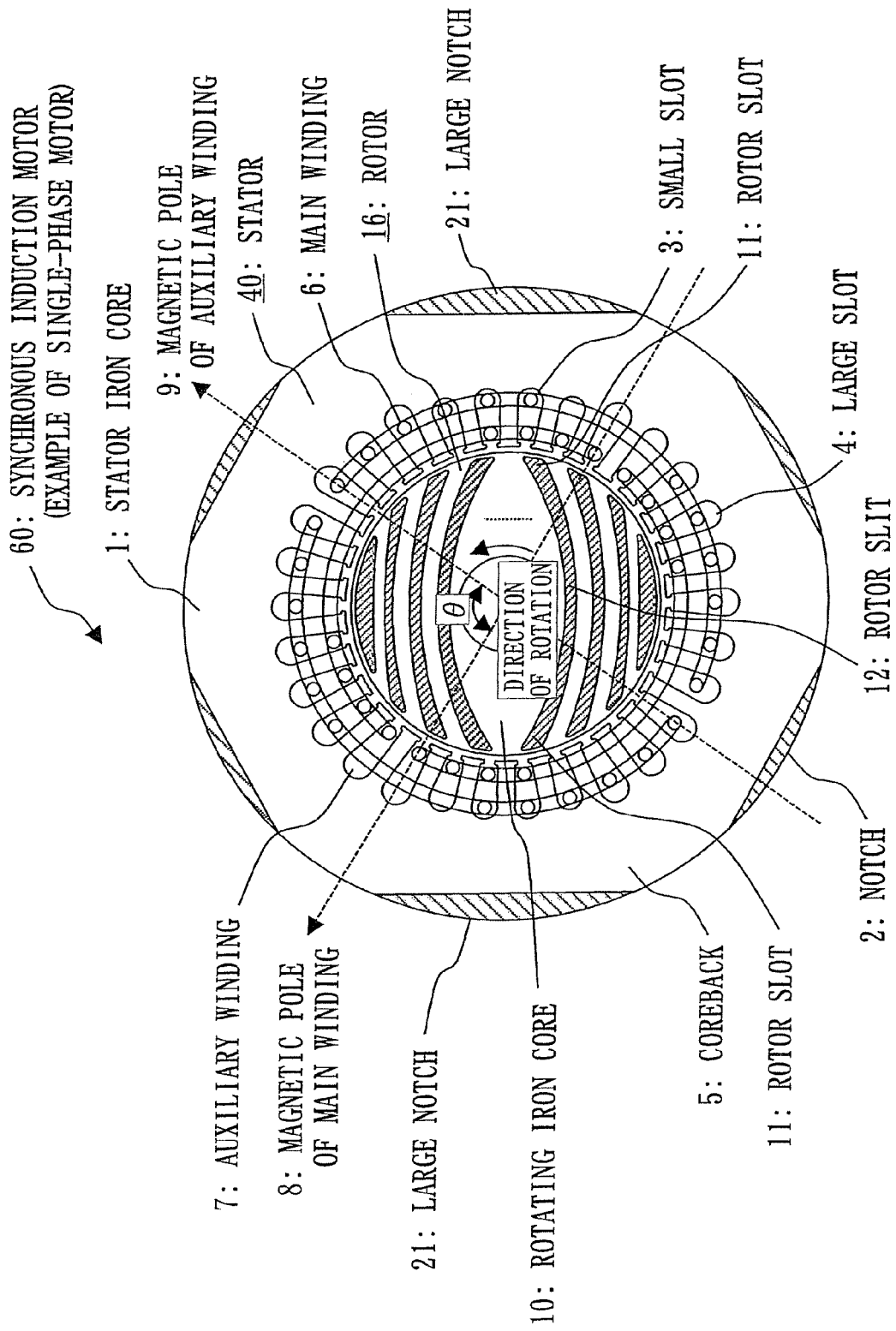
FIG. 11 shows the second embodiment and is a horizontal cross sectional view of the stator 40 of a single-phased motor used for a synchronous induction motor 60.
Figure 12:
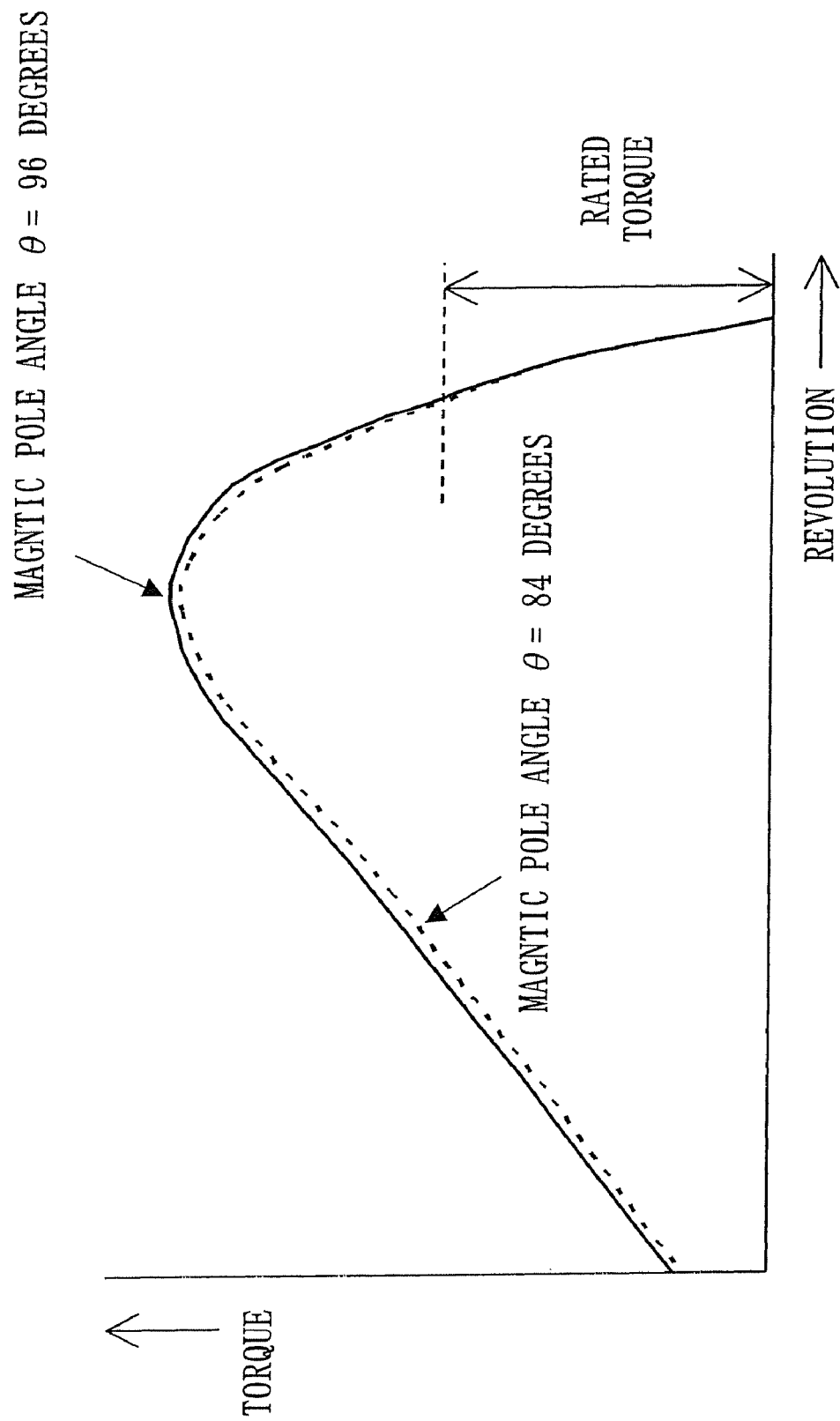
FIG. 12 shows the third embodiment and shows torque characteristics in respect of the revolution of a single-phase induction motor 50.
Figure 13:
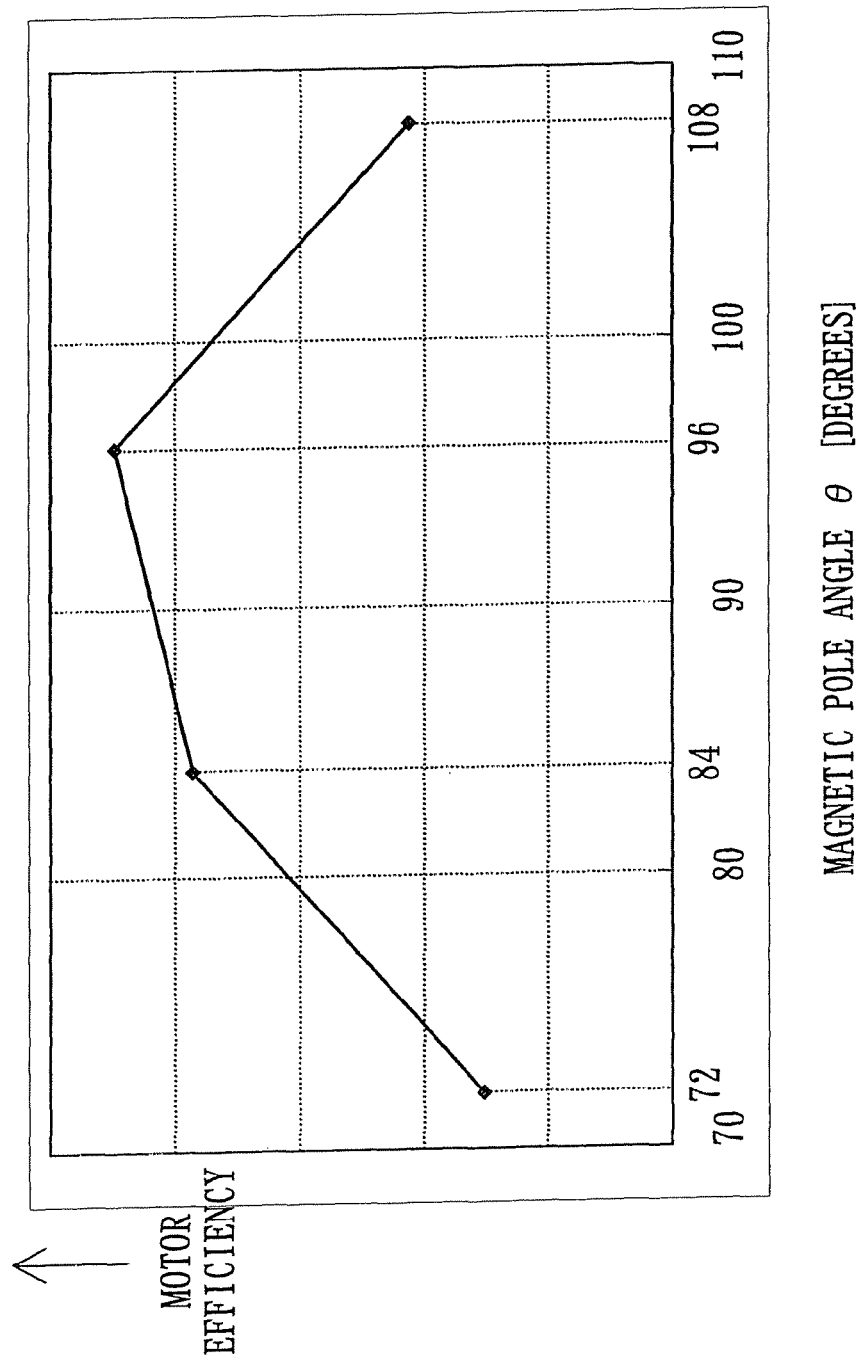
FIG. 13 shows the third embodiment and shows motor efficiency characteristics in respect of a magnetic pole angle of a single-phase induction motor 50.

1: a stator iron core; 2: a notch; 3: a small slot; 4: a large slot; 5: a coreback; 6: a main winding; 7: an auxiliary winding; 8: a main winding magnetic pole; 9: an auxiliary winding magnetic pole; 10: a rotor iron core; 11: a rotor slot; 12: a rotor slit; 15: a rotor; 16: a rotor; 21: a large notch; 30: a stator; 40: a stator; 50: an induction motor; 60: a synchronous induction motor; 100: a rotary compressor; 102: a hermetic container; 103: motor elements; 104: compressor elements; 105: a crank shaft; 105a: an eccentric part; 106: a compressing space; 107: a cylinder; 108: an upper bearing; 109: a lower bearing; 110: a rolling piston; 111: a suction tube; 112: a discharge tube; m1: the first coil; m2: the second coil; m3: the third coil; m4: the fourth coil; m5: the fifth coil; m6: the sixth coil; a1: the first coil; a2: the second coil; a3: the third coil; a4: the fourth coil; M1 through M6: the number of main windings; A1 through A5: the number of auxiliary windings; S1 through S17: slot numbers; and θ: a magnetic pole angle.

The invention claimed is:

1. A single-phase motor comprising:
a stator iron core formed by laminating a plurality of electromagnetic steel sheets and provided with N slots, where N/2 is odd, a part of which are large slots and others are small slots having a shallower depth in a radial direction;
a main winding of 2-pole single-phase concentric winding arrangement inserted to the large slots or the small slots; and
an auxiliary winding of 2-pole single-phase concentric winding arrangement inserted to the large slots or the small slots,
wherein a magnetic pole angle, which is an angle formed by a main winding magnetic pole generated by flowing electric current to the main winding and an auxiliary winding magnetic pole generated by flowing electric current to the auxiliary winding, is made (90−360/2N) degrees or (90+360/2N) degrees, and
wherein an occupying rate of winding is defined as a rate of cross section area of winding occupied in a slot area, and those of the N slots having an occupying rate of winding which is smaller than would otherwise be the case if the magnetic pole angle were instead 90 degrees, are made the small slots, and the other slots are made the large slots.

2. The single-phase motor of claim 1, wherein the outer circumferential surface of the core includes a plurality of generally straight-lined notches formed therein, one of the notches having a larger notched area than other notches and situated generally radially opposite the smaller slots.

3. The single-phase motor of claim 2, wherein there are two sets of smaller slots spaced apart by generally 180 degrees, and there are two notches having a larger notched area than other notches and being disposed radially opposite respective ones of the sets of smaller slots, all of the slots arranged to lie on an axisymmetric hexagon.

4. The single-phase motor of claim 1, wherein the single-phase motor is an induction motor.

5. The single-phase motor of claim 1, wherein the single-phase motor is a synchronous induction motor.

6. A hermetic compressor comprising the single-phase motor of claim 1.

7. The single-phase motor of claim 2, wherein the single-phase motor is an induction motor.

8. The single-phase motor of claim 3, wherein the single-phase motor is an induction motor.

9. The single-phase motor of claim 2, wherein the single-phase motor is a synchronous induction motor.

10. The single-phase motor of claim 3, wherein the single-phase motor is a synchronous induction motor.

11. A hermetic compressor comprising the single-phase motor of claim 2.

12. A hermetic compressor comprising the single-phase motor of claim 3.

13. The single-phase motor of claim 1, wherein said at least one small slot consists of a plurality of the small slots.

14. A single-phase motor comprising:
a stator iron core formed by laminating a plurality of electromagnetic steel sheets and provided with N slots, where N/2 is odd, a part of which are large slots and others are small slots having a shallower depth in a radial direction;
a main winding of 2-pole single-phase concentric winding arrangement inserted to the large slots or the small slots; and
an auxiliary winding of 2-pole single-phase concentric winding arrangement inserted to the large slots or the small slots,
wherein an angle formed by a main winding magnetic pole generated by flowing electric current to the main winding and an auxiliary winding magnetic pole generated by flowing electric current to the auxiliary winding is made (90−360/2N) degrees or (90+360/2N) degrees,
wherein an occupying rate of winding is defined as a rate of cross section area of winding occupied in a slot area, and among the N slots, all slots of which the occupying rate of winding is made smaller by arranging the magnetic pole angle at (90−360/2N) degrees or (90+360/2N) degrees with respect to the occupying rate in case of arranging the magnetic pole angle at 90 degrees are made the small slots, and other slots are made the large slots,
wherein a plurality of notches formed as straight lined parts including a large notch provided at an outer circumferential side of the small slots at an outer circumferential part of the stator iron core, and
wherein the straight lined part of the large notch provided at the outer circumferential side of the small slots is arranged at a center side of the stator iron core so as to have a larger notched area than other notches.

15. The single-phase motor of claim 1, wherein at least one of the small slots contains both the main winding and the auxiliary winding.

* * * * *